UNITED STATES PATENT OFFICE.

HARRY WILLIAMS CHARLTON, OF NEW YORK, N. Y., ASSIGNOR TO AMERICAN POTASH CORPORATION, A CORPORATION OF VIRGINIA.

ALKALI-HYDRATE SOLUTION.

1,334,989.  Specification of Letters Patent.  Patented Mar. 30, 1920.

No Drawing.  Application filed November 30, 1917. Serial No. 204,539.

*To all whom it may concern:*

Be it known that I, HARRY WILLIAMS CHARLTON, a citizen of Canada, residing in New York, in the county of New York and State of New York, have invented a new and useful Alkali-Hydrate Solution; and I do hereby declare the following to be a full, clear, and exact description of the invention, such as will enable others skilled in the art to which it appertains to make and use the same.

This invention relates to a new article of manufacture resulting from the digestion of glauconite, commonly called greensand, in the manner and as fully described in my application Serial No. 262,123, filed November 12th, 1918. As an example of the process, I may digest 500 parts of finely ground greensand and from 400 to 500 parts of lime with 2500 parts of water at a pressure of about 225 pounds per square inch, and at a corresponding temperature, for a period of from 2 to 4 hours. The solid residue is then filtered off and the filtrate concentrated. It is the filtrate either as such or in its concentrated form that I desire to specially refer to in this application. It comprises potassium hydrate accompanied by small amounts of potassium chlorid, sulfate, silicate, and organic matter. Its particular composition renders it especially valuable in causticizing processes particularly where the absence of aluminium and sodium is of paramount importance. It is also of great value in the production of fine chemicals of various postassium salts. As is well known the presence of aluminium compounds render potassium hydrate of little value in some industries, and sodium compounds are in most cases equally objectionable. The fact that both are absent in this caustic alkali is a feature of the greatest importance and one that could not be foreseen considering the origin and nature of greensand.

The following is an analysis of the solution which has been evaporated and is given to show the relative proportion of the various solid constituents in the solution.

| | |
|---|---|
| $K_2O$ | 77.20% |
| $SO_3$ | .90% |
| $Cl_2$ | .35% |
| $SiO_2$ | .70% |
| $Al_2O_3$ | Free |

In addition to the above materials there is a certain amount of organic matter. It is extracted from the greensand directly in which it occurs in the form of an obscure compound. As shown by the analysis the proportion of potassium hydrate is nearly 98% and in fact factory operations show even a higher percentage, but to cover the extreme limit possible of impurity 95% is mentioned.

Of the various advantages of employing the caustic liquor is the fact that it may be concentrated to any desired point which is deemed most suitable for the purposes in hand, and resulting as it does from a simple digestion of crude, unrefined or picked sand occurring in vast deposits in the ground, it is and has become an article of manufacture; a material that is of great value as it fills a long felt want in a simple, cheap and satisfactory manner.

It is obvious that those skilled in the art may vary the details of the method of manufacture as well as the source and composition of the greensand so that the article manufactured will differ slightly without in any way departing from the spirit of the invention, and therefore I do not wish to be limited to the above disclosures except as may be required by the claims.

What I claim is:

1. As a new article of manufacture the herein described digestion product obtained from green sand, said product being substantially free from combined sodium and aluminum, and consisting of a crude solution of potassium hydrate, the solids of which contain more than 95% KOH as well as organic matter and as traces of other compounds of potassium substantially as described.

2. As a new article of manufacture the herein described digestion product obtained from green sand, said product being substantially free from combined sodium and aluminum, and consisting of a crude solution of potassium hydrate, the solids of which contain more than 95% KOH as well as organic matter, potassium chlorid and other potassium compounds, substantially as described.

3. As an article of manufacture a digestion product comprising a solution of potassium compounds free from sodium and aluminium compounds, over 95% of the solids being potassium hydrate, and potassium chlorid, sulfate, silicate and organic matter comprising the remainder; substantially as described.

4. As an article of manufacture a digestion product comprising a solution of potassium compounds free from sodium and aluminium compounds with almost 98% of the solids in the form of potassium hydrate, and potassium chlorid, sulfate, silicate and organic matter comprising the remainder; substantially as described.

HARRY WILLIAMS CHARLTON.